(12) United States Patent
Seo et al.

(10) Patent No.: US 11,913,393 B1
(45) Date of Patent: Feb. 27, 2024

(54) FUEL SYSTEM FOR PREVENTING FUEL TANK EXPANSION

(71) Applicants: HYUNDAI MOTOR COMPANY, Seoul (KR); KIA CORPORATION, Seoul (KR)

(72) Inventors: Yoo Jin Seo, Suwon-si (KR); Sun Jin Kim, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/196,880

(22) Filed: May 12, 2023

(30) Foreign Application Priority Data

Apr. 21, 2023 (KR) .......................... 10-2023-0052861

(51) Int. Cl.
| | |
|---|---|
| *F02D 41/00* | (2006.01) |
| *F02M 25/08* | (2006.01) |
| *F02B 37/18* | (2006.01) |
| *F02B 37/16* | (2006.01) |
| *G07C 5/08* | (2006.01) |

(52) U.S. Cl.
CPC .......... *F02D 41/004* (2013.01); *F02B 37/162* (2019.05); *F02B 37/183* (2013.01); *F02D 41/0007* (2013.01); *F02M 25/0809* (2013.01); *F02M 25/0836* (2013.01); *G07C 5/0808* (2013.01); *G07C 5/0825* (2013.01); *F02D 2200/0406* (2013.01); *F02D 2200/703* (2013.01)

(58) Field of Classification Search
CPC ............ F02D 41/004; F02B 37/16–162; F02B 37/18–183; F02M 25/0827; F02M 25/0809

See application file for complete search history.

(56) References Cited

U.S. PATENT DOCUMENTS

| | | | |
|---|---|---|---|
| 2010/0223984 A1* | 9/2010 | Pursifull | G01M 15/04 73/114.39 |
| 2010/0224171 A1* | 9/2010 | Peters | F02M 25/089 123/520 |
| 2023/0014329 A1* | 1/2023 | Dudar | F02M 25/0836 |

* cited by examiner

*Primary Examiner* — Ngoc T Nguyen
(74) *Attorney, Agent, or Firm* — Lempia Summerfield Katz LLC (57) ABSTRACT

A vehicle fuel system includes a turbocharger having a compressor disposed on an intake line of an engine. The compressor selectively compresses intake air supplied to the engine. The fuel system has a canister configured to capture fuel vapor discharged from a fuel tank and a purge control valve configured to open or close the purge line depending on a pressure of the intake line. The fuel system has a check valve provided on the purge line that blocks movement of a fluid from the intake line to the canister. The fuel system has a controller performing control such that the purge control valve is operated in a closed mode to prevent intake air in the intake line from being introduced into the fuel tank when breakdown of the check valve is sensed during driving of the vehicle.

18 Claims, 4 Drawing Sheets

FUEL SYSTEM FOR PREVENTING FUEL TANK EXPANSION

CROSS-REFERENCE TO RELATED APPLICATION

This application claims, under 35 U.S.C. § 119(a), the benefit of priority to Korean Patent Application No. 10-2023-0052861 filed on Apr. 21, 2023, the entire contents of which are incorporated herein by reference.

BACKGROUND

(a) Technical Field

The present disclosure relates to a fuel system for preventing expansion of a fuel tank, and more particularly to a fuel system capable of preventing expansion of a fuel tank due to introduction of intake air.

(b) Background Art

In general, a turbo vehicle is a vehicle equipped with a turbocharger driven by exhaust gas discharged from an engine. The turbocharger includes a turbine driven by exhaust gas and a compressor driven by the turbine to compress air introduced into the engine.

The turbo vehicle includes a canister configured to capture fuel vapor discharged from a fuel tank, a purge control valve configured to purge the fuel vapor captured in the canister to an intake line of the engine, and a purge line having the purge control valve provided thereon. In addition, a check valve is provided on the purge line. The check valve prevents intake air compressed by the turbocharger from flowing to the canister and the fuel tank via the purge line when the vehicle is accelerated.

When the check valve breaks down, however, the intake air compressed by the turbocharger may flow to the canister and the fuel tank via the purge line. When this occurs, the compressed intake air may be introduced into the fuel tank, whereby the pressure in the fuel tank may be excessively increased. Therefore, the fuel tank may expand.

The above information disclosed in this Background section is provided only to enhance understanding of the background of the disclosure. Therefore, the Background section may contain information that does not form the prior art that is already known to a person of ordinary skill in the art.

SUMMARY OF THE DISCLOSURE

The present disclosure has been made in an effort to solve the above-described problems associated with the prior art.

It is an object of the present disclosure to provide a fuel system capable of preventing air in an intake line of an engine from being introduced into a fuel tank when a check valve breaks down.

The objects of the present disclosure are not limited to those described above. Other unmentioned objects of the present disclosure should be more clearly understood by a person of ordinary skill in the art from the following description.

In order to accomplish the above objects, the present disclosure provides a fuel system for a vehicle. The fuel system includes a turbocharger having a compressor disposed on an intake line of an engine. The compressor is configured to selectively compress intake air supplied to the engine. The fuel system has a canister connected to the intake line via a purge line. The canister is configured to capture fuel vapor discharged from a fuel tank. The fuel system has a purge control valve provided on the purge line. The purge control valve is configured to open or close the purge line depending on a pressure of the intake line. The fuel system has a check valve provided on the purge line. The check valve is configured to block movement of a fluid from the intake line to the canister. The fuel system has a controller configured to perform control such that the purge control valve is operated in a closed mode to prevent intake air in the intake line from being introduced into the fuel tank when a breakdown of the check valve is sensed during driving of a vehicle.

In an embodiment of the present disclosure, the controller may determine whether the check valve has broken down based on the pressure of intake air detected at the rear of the compressor of the turbocharger and the pressure in the fuel tank. Specifically, when the pressure of the intake air is equal to or greater than a first air pressure set to a higher pressure than atmospheric pressure and the pressure in the fuel tank is greater than a first tank pressure set to a pressure at which the fuel tank is expandable, the controller may determine that the check valve has broken down. In addition, when the pressure of the intake air is less than the first air pressure or the pressure in the fuel tank is equal to or less than the first tank pressure, the controller may determine that the check valve has not broken down.

In another embodiment of the present disclosure, when the temperature of an engine coolant is less than a predetermined first temperature and the temperature of outside air is equal to or less than a predetermined second temperature, the controller may determine whether the check valve has broken down based on the pressure of the intake air and the pressure in the fuel tank.

In a further embodiment of the present disclosure, when the condition in which the pressure of the intake air is equal to or greater than the first air pressure and the condition in which the pressure in the fuel tank is greater than the first tank pressure are maintained for a predetermined reference time or more, the controller may determine that the check valve has broken down. In addition, when the condition in which the pressure of the intake air is equal to or greater than the first air pressure and the condition in which the pressure in the fuel tank is greater than the first tank pressure are not maintained for the reference time, the controller may determine that the check valve has not broken down.

In another embodiment, when the pressure in the fuel tank is reduced to less than a second tank pressure set to a lower pressure than the first tank pressure after performing control such that the purge control valve is operated in the closed mode, the controller may perform control such that the purge control valve is continuously operated in the closed mode until the pressure of the intake air is reduced to less than a second air pressure set to a lower pressure than the first air pressure. The second air pressure may be atmospheric pressure.

In another embodiment, when the pressure in the fuel tank is equal to or greater than the second tank pressure after performing control such that the purge control valve is operated in the closed mode, the controller may perform control such that at least one of a recirculation valve and a wastegate valve is operated in an open mode to reduce the pressure of the intake air in the intake line. The recirculation valve may be controlled to open or close an intake bypass line provided on the intake line and the intake bypass line may bypass the compressor and may interconnect a front end and a rear end of the compressor. In addition, the wastegate valve may be configured to open or close an exhaust bypass line provided on an exhaust line of the engine. The exhaust bypass line may bypass a turbine of the turbocharger provided on the exhaust line and may interconnect a front end and a rear end of the turbine. The turbine may be rotated by exhaust gas flowing in the exhaust line and may be coupled to the compressor of the turbocharger to be rotatable with the compressor.

In another embodiment, the controller may perform control such that a throttle valve configured to open or close the intake line is operated in a closed mode when the recirculation valve is operated in the open mode. The throttle valve may be located on the intake line at the rear of the compressor.

In another embodiment, the controller may increase the degree of opening of the wastegate valve at a predetermined speed when the wastegate valve is operated in the open mode. The flow rate of exhaust gas necessary to rotate the turbine may be controlled depending on the degree of opening of the wastegate valve.

In another embodiment, when the pressure of the intake air at the rear of the compressor is reduced to less than the second air pressure in the state in which at least one of the recirculation valve and the wastegate valve is operated in the open mode, the controller may switch the mode of the purge control valve from the closed mode to an open mode.

In another embodiment, when a breakdown of the check valve is sensed during driving of the vehicle, the controller may cumulatively count the number of check valve breakdown detections. When the number of check valve breakdown detections is equal to or greater than a predetermined number of times upon restart of the vehicle, the controller may turn on a warning light to inform a user of breakdown of the check valve.

In another embodiment, when the number of check valve breakdown detections is less than the predetermined number of times, the controller may not turn on the warning light.

Other aspects and embodiments of the disclosure are discussed below.

BRIEF DESCRIPTION OF THE DRAWINGS

The above and other features of the present disclosure are described in detail with reference to certain embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the embodiments of the present disclosure as disclosed and described herein, including, for example, specific dimensions, orientations, locations, and shapes, will be determined in part by the particular intended application and use environment.

In the figures, the same reference numbers refer to the same or equivalent parts of the present disclosure throughout the several figures of the drawings.

DETAILED DESCRIPTION

Specific structural or functional descriptions of the embodiments of the present disclosure described in this specification are given only for illustrating embodiments of the present disclosure. Embodiments of the present disclosure may be implemented in various forms. In addition, the embodiments according to the concept of the present disclosure are not limited to such specific embodiments. It should be understood that the present disclosure includes all alterations, equivalents, and substitutes that fall within the idea and technical scope of the present disclosure.

It should be understood that, although the terms "first", "second", etc. may be used herein to describe various elements, corresponding elements should not be understood as being limited by these terms. Such terms are used only to distinguish one element from another. For example, within the scope defined by the present disclosure, a first element may be referred to as a second element, and similarly, a second element may be referred to as a first element.

It should be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", should be interpreted in the same manner.

Wherever possible, the same reference numbers are used throughout the drawings to refer to the same or like parts. The terms used in this specification are provided only to explain specific embodiments but are not intended to restrict the present disclosure. A singular representation may include a plural representation unless it represents a definitely different meaning from the context. It should be further understood that the terms "comprises", "comprising", and the like and variations thereof, when used in this specification, specify the presence of stated components, steps, operations, and/or elements, but do not preclude the presence or addition of one or more other components, steps, operations, and/or elements.

Hereinafter, embodiments of the present disclosure are described in detail with reference to the accompanying drawings. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part of the apparatus.

First, a fuel system of a turbo vehicle is described with reference to FIG. 1 in order to assist in understanding the present disclosure.

Figure 1:
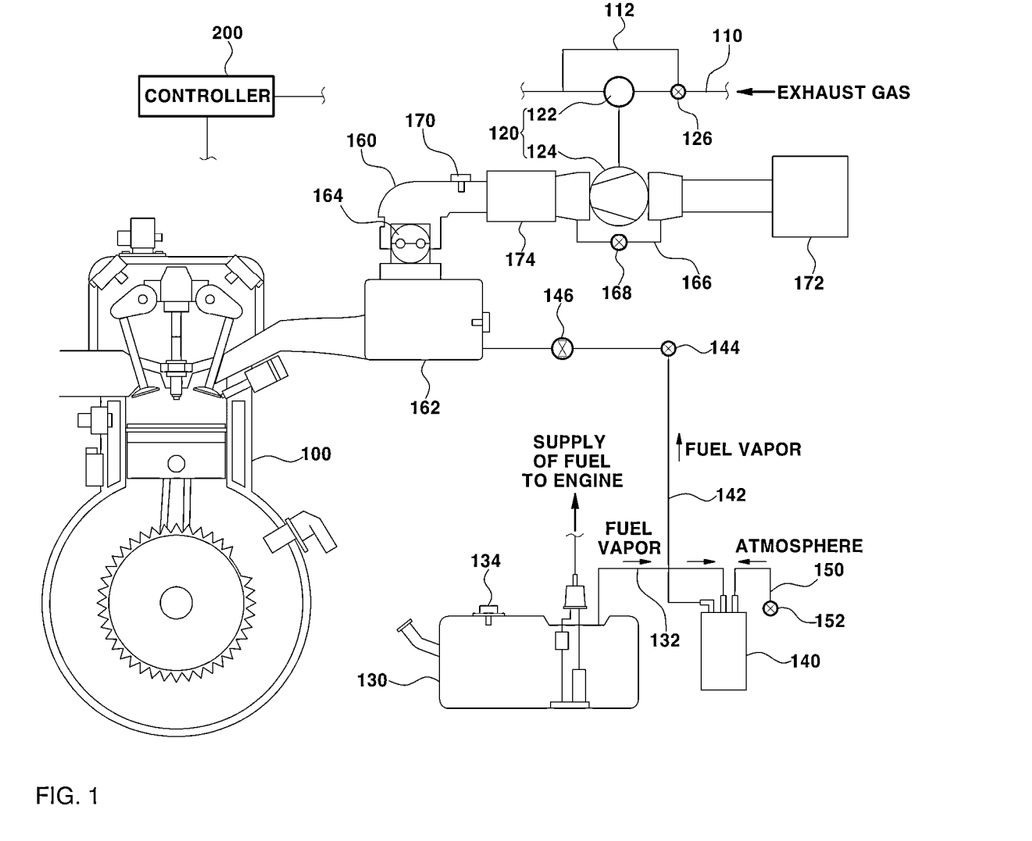
FIG. 1 is a view showing a fuel system of a turbo vehicle according to an embodiment of the present disclosure.

As shown in FIG. 1, the turbo vehicle includes a turbocharger 120 configured to be driven by exhaust gas discharged from an engine 100. The turbocharger 120 includes a turbine 122 provided on an exhaust line 110 of the engine 100. The turbine 122 is configured to be rotated by the flow of exhaust gas. The turbocharger 120 also includes a compressor 124 provided on an intake line 160 of the engine 100. The compressor is configured to be driven by the turbine 122. The compressor 124 is coupled to the turbine 122 to be rotatable with the turbine. When the turbine 122 is driven, the compressor 124 compresses air supplied to the engine via the intake line 160 (or intake air).

A fuel tank 130 is configured to store fuel necessary to drive the engine 100 and is connected to a canister 140 via a vapor line 132. Fuel vapor (or fuel evaporation gas) is generated from the fuel stored in the fuel tank 130 and the fuel vapor discharged from the fuel tank 130 flows to the canister 140 via the vapor line 132.

The canister 140 is configured to capture the fuel vapor discharged from the fuel tank 130. The canister 140 is fluidly connected to the intake line 160 of the engine 100 via a purge line 142. The purge line 142 is connected to the canister 140 and a surge tank 162 provided on the intake line 160. In addition, a purge control valve 144 and a check valve 146 are provided on the purge line 142. The purge control valve 144 may also be called a purge control solenoid valve (PCSV).

The purge control valve 144 selectively purges the fuel vapor captured in the canister 140 to the intake line 160. The purge control valve 144 is configured to open or close the purge line 142 depending on the pressure of the intake line 160. When negative pressure is formed in the intake line 160, the purge control valve 144 is operated in an open mode under control of a controller 200.

The check valve 146 is a one-way valve configured to prevent air boosted by the turbocharger 120 from flowing to the canister 140 via the purge line 142. In other words, the check valve 146 is a mechanical valve configured to block movement of a fluid from the intake line 160 to the canister 140.

In addition, the canister 140 communicates with the atmosphere via an air line 150. A canister close valve 152 is provided on the air line 150. The canister close valve 152 is usually operated in an open mode. Only when leakage of the fuel vapor is detected, the canister close valve 152 is temporarily operated in a closed mode. Since the canister close valve 152 is normally operated in the open mode, deformation of the fuel tank 130 and the canister 140 due to negative pressure is prevented when the fuel vapor captured in the canister is purged to the surge tank 162.

In order to diagnose leakage of fuel vapor from the fuel tank 130, a tank pressure sensor 134 is configured to detect the pressure of the fuel tank 130 and is installed in the fuel tank 130. The tank pressure sensor 134 transmits information about the pressure in the fuel tank 130 detected in real time to the controller 200.

An electronic throttle valve 164 located at the rear of the compressor 124 and in front of the surge tank 162 and an electronic recirculation valve (RCV) 168 located in front of the throttle valve 164 are each provided on the intake line 160. In addition, a boost pressure sensor 170 is provided on the intake line 160.

In this specification, the terms "front", "rear", "front end", and "rear end" are defined based on the flow direction of a fluid.

The throttle valve 164 opens or closes the intake line 160 under control of the controller 200. The amount of air supplied to the engine 100 is adjusted by the degree of opening of the throttle valve 164. The degree of opening of the throttle valve 164 may be controlled based on the degree of depression of an accelerator of the vehicle.

The recirculation valve 168 is provided on an intake bypass line 166 and is controlled to open or close the intake bypass line 166. The intake bypass line 166 is connected to the intake line 160 so as to bypass the compressor 124. In other words, the intake bypass line 166 fluidly interconnects a front end and a rear end of the compressor 124 provided on the intake line 160. The recirculation valve 168 selectively opens the intake bypass line 166 such that air at the rear of the compressor 124 can flow to the front of the compressor 124.

When the accelerator is released or not depressed, whereby the throttle valve 163 is closed, during driving of the vehicle, the recirculation valve 168 is operated in an open mode under control of the controller 200. Thus, it is possible to reduce the pressure of the intake air boosted by the compressor 124.

The boost pressure sensor 170 is a sensor configured to detect the pressure of intake air that has passed through the compressor 124 of the turbocharger 120. The boost pressure sensor 170 is located between the compressor 124 and the throttle valve 164.

In addition, an exhaust bypass line 122 is configured to bypass the turbine 122 of the turbocharger 120 and is provided on the exhaust line 110 of the engine 100. The exhaust bypass line 122 fluidly interconnects a front end and a rear end of the turbine 122. An electronic wastegate valve (WGV) 126 is controlled by the controller 200 and is provided in an inlet of the exhaust bypass line 122.

The wastegate valve 126 is configured to open or close the exhaust bypass line 122. The flow rate of exhaust gas that rotates the turbine 122 while passing through the turbine may be controlled depending on the degree of opening of the wastegate valve 126. The flow rate of exhaust gas necessary to drive the turbine 122 is controlled depending on the degree of opening of the wastegate valve 126, whereby the air compression rate of the compressor 124 is changed.

Electronic parts provided in the fuel system may be controlled by the controller 200 and the controller 200 may collect information necessary to control the electronic parts. For example, the controller 200 may collect values measured by sensors in real time in order to control open and closed modes of the valves. The controller 200 may be constituted by at least one of various control devices provided in the vehicle. For example, the controller 200 may be an engine control device.

In FIG. 1, reference numerals 172 and 174 indicate an air cleaner and an intercooler, respectively.

Meanwhile, when the check valve 146 of the fuel system is damaged, the intake air compressed by the turbocharger 120 may flow to the canister 140 and the fuel tank 130 via the purge line 142. At this time, when the pressure in the fuel tank 130 excessively increases as the result of the compressed intake air being introduced into the fuel tank 130, the fuel tank 130 may expand.

In the present disclosure, the fuel system enters a fail-safe mode to prevent air compressed by the turbocharger 120 from being introduced into the fuel tank 130 when the check valve 146 breaks down. To this end, when breakdown of the check valve 146 is detected during driving of the vehicle, the controller 200 performs control such that the purge control valve 144 is operated in the closed mode in order to block introduction of compressed air into the fuel tank 130 from the intake line 160 via the purge line 142.

Hereinafter, a fuel tank expansion preventing method according to the present disclosure is described with reference to FIGS. 2-4.

Figure 2:
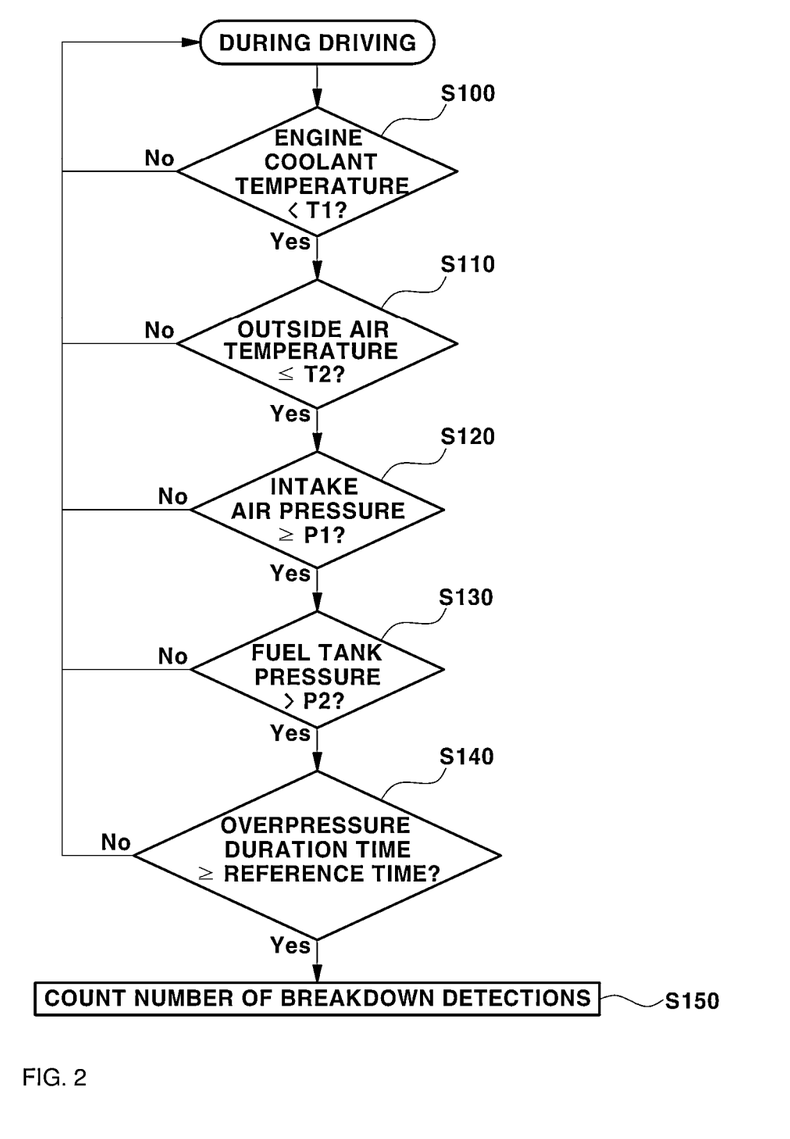
FIGS. 2-4 are flowcharts showing a method of preventing expansion of a fuel tank of a fuel system according to an embodiment of the present disclosure.

As shown in FIG. 2, the controller 200 determines whether the fuel tank 130 has overheated based on the temperature of an engine coolant and the temperature of outside air during driving of the vehicle (S100 and S110). The reason for this is that it is necessary to exclude the case in which the pressure in the fuel tank 130 is increased by heat of the engine 100 and heat of the outside air. Since the condition in which the pressure in the fuel tank 130 is increased by ambient heat is excluded, it is possible to more accurately determine breakdown of the check valve 146.

In steps S100 and S110, the controller 200 compares the temperature of the engine coolant with a predetermined first temperature T1 and also compares the temperature of the outside air with a predetermined second temperature T2. The controller 200 may receive engine coolant temperature information and outside air temperature information from a coolant temperature sensor and an outside air temperature provided in the fuel system. The first temperature T1 is set to a coolant temperature value that may increase the pressure of the fuel tank 130. The second temperature T2 is set to an outside air temperature value that may increase the pressure of the fuel tank 130. For example, the first temperature T1 may be set to 80° C. and the second temperature T2 may be set to 40° C.

When the temperature of the engine coolant is less than the first temperature T1 and the temperature of the outside air is equal to or less than the second temperature T2, the controller 200 determines that the pressure of the fuel tank 13 has not been increased by ambient temperature. In other words, when the temperature of the engine coolant is less than the first temperature T1 and the temperature of the outside air is equal to or less than the second temperature T2, the controller 200 determines whether the check valve has broken down based on the pressure of intake air detected at the rear of the compressor 124 and the pressure in the fuel tank 130. When the temperature of the engine coolant is equal to or greater than the first temperature T1 or the temperature of the outside air is greater than the second temperature T2, the controller 200 determines that the pressure of the fuel tank 13 has been increased by ambient temperature.

In addition, although not shown in the figures, the controller 200 may determine whether electronic parts, such as sensors and valves, provided in the fuel systems have broken down before determination as to whether the fuel tank 130 has overheated. For example, the controller 200 may determine whether the canister close valve 152, the tank pressure sensor 134, the purge control valve 144, the wastegate valve 126, and the coolant temperature sensor (not shown) have broken down. Upon determining that the parts have not broken down, the controller 200 executes steps S100 and S110.

After step S110, the controller 200 executes step S120. The controller 200 determines whether the check valve 146 has broken down based on the pressure of intake air and the pressure of the fuel tank 130 (S120 and S130). The pressure of the intake air is sensed by the boost pressure sensor 170 located at the rear of the compressor 124.

In step S120, the controller 200 compares the pressure of the intake air with a predetermined first air pressure P1. When the pressure of the intake air is equal to or greater than the first air pressure P1, the controller 200 determines that intake air introduced into the intake line 160 has been boosted by the compressor 124. For example, the first air pressure P1 may be set to 1.2 bar, which is higher than atmospheric pressure.

When the pressure of the intake air is equal to or greater than the first air pressure P1, the controller 200 compares the pressure in the fuel tank 130 with a predetermined first tank pressure P2 (S130). For example, the first tank pressure P2 may be set to 60 hPa. When the pressure in the fuel tank 130 measured in real time is greater than the first tank pressure P2, the controller 200 determines that the fuel tank 130 is in an overpressure state in which the fuel tank may expand.

In order to solve such a temporary overpressure state of the fuel tank 130, the controller 200 counts or determines the time elapsed from the time when the pressure in the fuel tank 130 was greater than the first tank pressure P2 was sensed (i.e. overpressure duration time of the fuel tank). In step S140, the controller 200 compares the overpressure duration time with a predetermined reference time. For example, the reference time may be set to 5 seconds. When the overpressure duration time is less than the reference time, the controller 200 continuously detects the pressure of the fuel tank 130 through the tank pressure sensor 134 in order to monitor the pressure of the fuel tank. When the overpressure duration time is equal to or greater than the reference time, the controller determines that the state in which the pressure in the fuel tank 130 is excessively increased is not temporary.

In other words, when the condition in which the pressure of the intake air at the rear of the compressor 124 is equal to or greater than the first air pressure P1 and the condition in which the pressure in the fuel tank 130 is greater than the first tank pressure P2 are maintained for the reference time or more, the controller 200 determines that the pressure in the fuel tank 130 remains excessively increased. At this time, the controller 200 determines that the intake air compressed by the turbocharger 120 has been introduced into the fuel tank 130 due to breakdown of the check valve 146, whereby the pressure in the fuel tank 130 has been abnormally increased. The pressure in the fuel tank 130 is usually negative.

In step S150, the controller 200 counts the number of times that breakdown of the check valve 146 was sensed (the number of check valve breakdown detections). The number of check valve breakdown detections is stored in a memory of the controller 200. The number of check valve breakdown detections is retained in the memory of the controller 200 even when the vehicle is turned off and parked. When the number of check valve breakdown detections is 1, a breakdown code for confirming that the check valve 146 has broken down is not stored.

Figure 3:
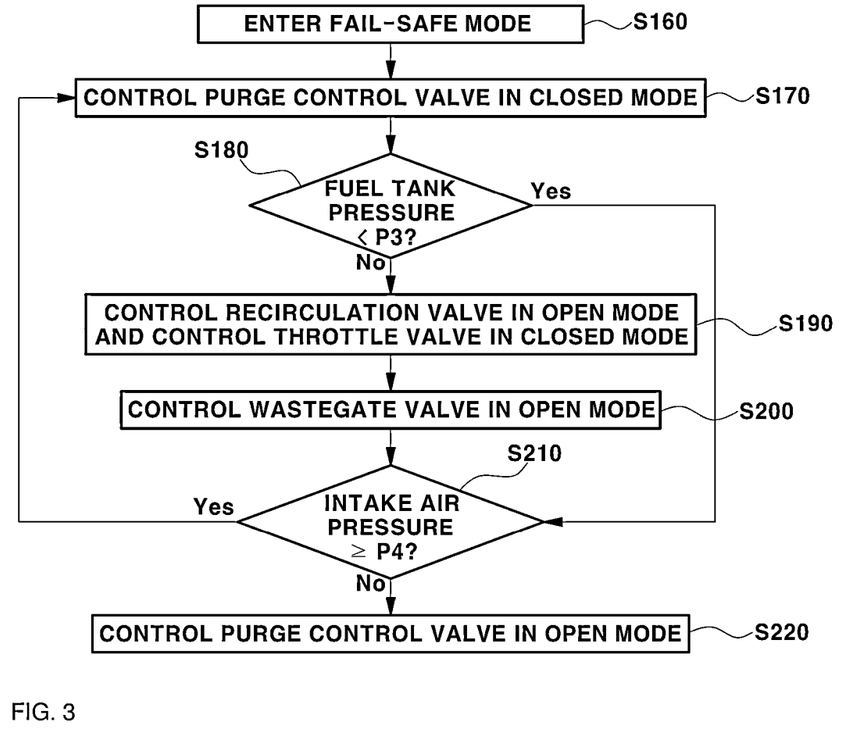

When breakdown of the check valve 146 is sensed in step S150, the controller 200 executes step S160 of FIG. 3. When breakdown of the check valve 146 is not sensed in step S150, the controller 200 executes step S100 again.

In step S160, the controller 200 performs control such that the fuel system enters a fail-safe mode (S160). At this time, the controller 200 performs control such that the purge control valve 144 is operated in the closed mode irrespective of whether negative pressure is formed in the intake line 160 (S170). In the closed mode, the purge control valve 144 closes the purge line 142 to block movement of a fluid. In other words, the purge control valve 144 is operated in the closed mode such that the pressure air from the intake line 160 is not introduced into the fuel tank 130.

Subsequently, the controller 200 compares the pressure in the fuel tank 130 with a predetermined second tank pressure P3 (S180). For example, the second tank pressure P3 may be set to 30 hPa. When the pressure in the fuel tank 130 is less than the second tank pressure P3 (YES in S180), the controller 200 determines that it is possible to reduce the pressure of the fuel tank 130 and to solve overpressure of the fuel tank 130 only by closing the purge line 142 using the purge control valve 144. In this case, the controller 200 directly executes step S210 without execution of steps S190 and S200.

When the pressure in the fuel tank 130 is equal to or greater than the second tank pressure P3 (NO in S180), the controller 200 determines that it is not possible to solve overpressure of the fuel tank 130 only by closing the purge line 142. In this case, the controller 200 executes steps S190 and S200 in order to reduce the pressure of the intake air.

In step S190, the controller 200 performs control such that the throttle valve 164 is operated in the closed mode and the recirculation valve 168 is operated in the open mode. In this case, introduction of intake air into the surge tank 162 is interrupted and the intake air at the rear of the compressor 124 flows back to the front of the compressor 124 via the intake bypass line 166, whereby the pressure of the intake air is reduced.

In step S200, the controller 200 performs control such that the wastegate valve 126 is operated in the open mode. In the open mode, the wastegate valve 126 closes an inlet of the turbine 122 in proportion to opening of the exhaust bypass line 112. In other words, the exhaust bypass line 112 is opened and the inlet of the turbine 122 is closed depending on the degree of opening of the wastegate valve 126. For example, when the exhaust bypass line 112 is completely opened by the wastegate valve 126, the inlet of the turbine 122 is completely closed.

When the wastegate valve 126 is operated in the open mode in step S200, therefore, at least some of exhaust gas flowing toward the turbine 122 bypasses the turbine 122 and flows to the exhaust bypass line 112. As a result, the rotational speed of the turbine 122 is reduced, and the amount of intake air compressed by the compressor 124 is reduced. At this time, the flow rate of the exhaust gas that bypasses the turbine 122 is determined depending on the degree of opening of the wastegate valve 126. Also, at this time, in order to prevent abrupt deceleration of the turbine 122, the degree of opening of the wastegate valve 126 is slowly increased at a predetermined speed. In step S200, the wastegate valve 126 may be completely opened.

In addition, although not shown in the figures, the controller 200 may selectively execute one of steps S190 and S200 in order to reduce the pressure of the intake air.

In step S210, the controller 200 compares the pressure of the intake air measured in real time by the boost pressure sensor 170 with a predetermined second air pressure P4. The second air pressure P4 is set to 1 bar, which is atmospheric pressure. When the pressure of the intake air is reduced to less than the second air pressure P4 (NO in S210), the controller 200 switches the mode of the purge control valve 144 from the closed mode to the open mode (S220). At this time, the degree of opening of the throttle valve 164 is controlled based on the degree of depression of the accelerator. When the pressure of the intake air is equal to or greater than the second air pressure P4 (YES in S210), the controller 200 performs control such that the purge control valve 144 is continuously operated in the closed mode and executes step S210 again. In other words, the controller 200 performs control such that the purge control valve 144 is continuously operated in the closed mode until the pressure of the intake air is reduced to less than the second air pressure P4.

When the breakdown of the check valve 146 is sensed, the vehicle is turned off. When the vehicle is restarted, the controller 200 executes step S230. Step S230 is shown in FIG. 4.

In step S230, the controller 200 compares the number of check valve breakdown detections with a predetermined number of times. The predetermined number of times is set to the number of times necessary to improve accuracy in sensing breakdown of the check valve 146 and to prevent incorrect sensing of breakdown of the check valve 146. For example, the predetermined number of times may be set to 2.

When the number of check valve breakdown detections is less than the predetermined number of times (YES in S230), the controller 200 temporarily releases the fail-safe mode (S240) and executes step S250. The fail-safe mode is temporarily released in order to sense breakdown of the check valve 146 again. When the fail-safe mode is released, the purge control valve 144 is opened or closed depending on the pressure of the intake line 160. When the number of check valve breakdown detections is equal to or greater than the predetermined number of times (NO in S230), the controller 200 executes step S100 again.

Figure 4:
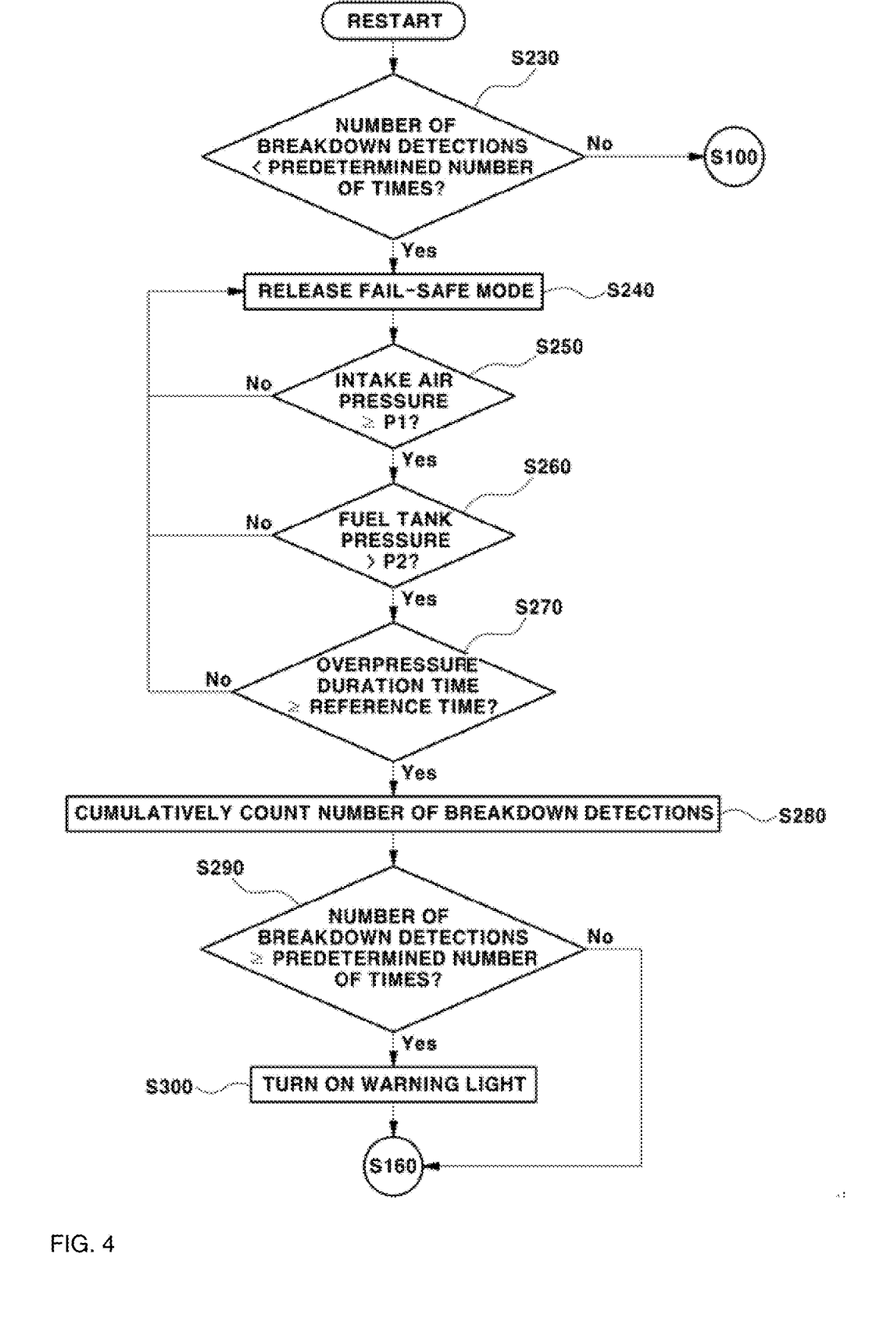

As shown in FIG. 4, the controller 200 compares the pressure of the intake air with the first air pressure P1 again (S250). When the pressure of the intake air is equal to or greater than the first air pressure P1 (YES in S250), the controller 200 compares the pressure of the fuel tank 130 with the first tank pressure P2 again (S260). In other words, the controller 200 determines again whether the check valve 146 has broken down based on the pressure of the intake air and the pressure of the fuel tank 130. In addition, when the pressure of the fuel tank 130 measured in real time is greater than the first tank pressure P2 (YES in S260), the controller 200 counts or determines the overpressure duration time of the fuel tank 130 again.

Subsequently, the controller 200 compares the overpressure duration time of the fuel tank 130 with the reference time again (S270). When the overpressure duration time is equal to or greater than the reference time (YES in S270), the controller 200 determines that the pressure in the fuel tank 130 has been excessively increased and cumulatively counts the number of check valve breakdown detections (S280). In other words, in step S280, the number of check valve breakdown detections is added to the number of check valve breakdown detections counted before restart of the vehicle.

Subsequently, the controller 200 compares the number of check valve breakdown detections with the predetermined number of times again (S290). When the number of check valve breakdown detections is equal to or greater than the predetermined number of times (YES in S290), the controller 200 stores a breakdown code for confirming that the check valve 146 has broken down in the memory of the controller and turns on a warning light to inform a user of breakdown of the check valve 146 (S300). After turning on the warning light, the controller 200 performs control such that the fuel system enters the fail-safe mode again (S160). Since repair or replacement of the check valve 146 is induced by turning on the warning light, it is possible to fundamentally prevent expansion of the fuel tank 130 due to breakdown of the check valve 146.

When the number of check valve breakdown detections is less than the predetermined number of times (NO in S290), the controller 200 performs control such that the fuel system immediately enters the fail-safe mode again without turning on the warning light (S160). Although not shown in the figures, the warning light is provided in the vehicle so as to be easily visible. After the fuel system enters the fail-safe mode, the controller 200 executes steps S170 to S220.

Although the embodiments of the present disclosure are described in detail above, the terms used in this specification and the claims should not necessarily be interpreted as having ordinary or dictionary-based meanings. In addition, the scope of rights of the present disclosure is not limited by the above embodiments. Various modifications and improvements based on the basic concept of the present disclosure defined in the claims are included in the scope of rights of the present disclosure.

As is apparent from the foregoing, the present disclosure has effects in that it is possible to prevent air in an intake line (i.e. intake air) from being introduced into a fuel tank via a purge line. Therefore, it is possible to prevent expansion of the fuel tank due to introduction of the intake air and to prevent a safety-related accident due to expansion of the fuel tank.

The effects of the present disclosure are not limited to those mentioned above. Other unmentioned effects should be more clearly understood by a person of ordinary skill in the art from the above description.

It should be apparent to a person of ordinary skill in the art that the present disclosure described above is not limited to the above embodiments and the accompanying drawings and that various substitutions, modifications, and variations can be made without departing from the technical idea of the present disclosure.

What is claimed is:

1. A fuel system of a vehicle, the fuel system comprising:
   a turbocharger including a compressor disposed on an intake line of an engine, the compressor being configured to selectively compress intake air supplied to the engine;
   a canister connected to the intake line via a purge line, the canister being configured to capture fuel vapor discharged from a fuel tank;
   a purge control valve provided on the purge line, the purge control valve being configured to open or close the purge line depending on a pressure of the intake line;
   a check valve provided on the purge line, the check valve being configured to block movement of a fluid from the intake line to the canister; and
   a controller configured to perform control such that the purge control valve is operated in a closed mode to prevent intake air in the intake line from being introduced into the fuel tank when it is determined that the check valve has broken down during driving of the vehicle.

2. The fuel system according to claim 1, wherein, when a temperature of an engine coolant is less than a predetermined first temperature and a temperature of outside air is equal to or less than a predetermined second temperature, the controller determines whether the check valve has broken down based on a pressure of intake air at a rear of the compressor and a pressure in the fuel tank.

3. The fuel system according to claim 1, wherein the controller determines whether the check valve has broken down based on a pressure of intake air detected at a rear of the compressor of the turbocharger and based on a pressure in the fuel tank.

4. The fuel system according to claim 3, wherein, when a condition in which the pressure of the intake air is equal to or greater than a first air pressure set to a higher pressure than atmospheric pressure and a condition in which the pressure in the fuel tank is greater than a first tank pressure set to a pressure at which the fuel tank is expandable are maintained for a predetermined reference time or more, the controller determines that the check valve has broken down.

5. The fuel system according to claim 4, wherein, when the condition in which the pressure of the intake air is equal to or greater than the first air pressure and the condition in which the pressure in the fuel tank is greater than the first tank pressure are not maintained for the reference time, the controller determines that the check valve has not broken down.

6. The fuel system according to claim 3, wherein, when the pressure of the intake air is equal to or greater than a first air pressure set to a higher pressure than atmospheric pressure and the pressure in the fuel tank is greater than a first tank pressure set to a pressure at which the fuel tank is expandable, the controller determines that the check valve has broken down.

7. The fuel system according to claim 6, wherein, when the pressure of the intake air is less than the first air pressure or the pressure in the fuel tank is equal to or less than the first tank pressure, the controller determines that the check valve has not broken down.

8. The fuel system according to claim 6, wherein, when the pressure in the fuel tank is reduced to less than a second tank pressure set to a lower pressure than the first tank pressure after performing control such that the purge control valve is operated in the closed mode, the controller performs control such that the purge control valve is continuously operated in the closed mode until the pressure of the intake air is reduced to less than a second air pressure set to a lower pressure than the first air pressure.

9. The fuel system according to claim 8, wherein the second air pressure is atmospheric pressure.

10. The fuel system according to claim 8, wherein, when the pressure in the fuel tank is equal to or greater than the second tank pressure after performing control such that the purge control valve is operated in the closed mode, the controller performs control such that at least one of a recirculation valve or a wastegate valve is operated in an open mode to reduce the pressure of the intake air in the intake line.

11. The fuel system according to claim 10, wherein
    the recirculation valve is configured to open or close an intake bypass line provided on the intake line, and
    the intake bypass line bypasses the compressor and interconnects a front end and a rear end of the compressor.

12. The fuel system according to claim 11, wherein the controller performs control such that a throttle valve configured to open or close the intake line is operated in a closed mode when the recirculation valve is operated in the open mode.

13. The fuel system according to claim 12, wherein the throttle valve is located on the intake line at a rear of the compressor.

14. The fuel system according to claim 10, wherein
    the wastegate valve is configured to open or close an exhaust bypass line provided on an exhaust line of the engine,
    the exhaust bypass line bypasses a turbine of the turbocharger provided on the exhaust line and interconnects a front end and a rear end of the turbine, and
    the turbine is rotated by exhaust gas flowing in the exhaust line and is coupled to the compressor of the turbocharger to be rotatable with the compressor.

15. The fuel system according to claim 14, wherein
    the controller increases a degree of opening of the wastegate valve at a predetermined speed when the wastegate valve is operated in the open mode, and
    a flow rate of exhaust gas to rotate the turbine is controlled depending on the degree of opening of the wastegate valve.

16. The fuel system according to claim 10, wherein, when the pressure of the intake air at the rear of the compressor is reduced to less than the second air pressure in a state in which at least one of the recirculation valve or the wastegate valve is operated in the open mode, the controller switches the mode of the purge control valve from the closed mode to an open mode.

17. The fuel system according to claim 1, wherein
when it is determined that the check valve has broken down during driving of the vehicle, the controller cumulatively counts a number of check valve breakdown detections, and
when the number of check valve breakdown detections is equal to or greater than a predetermined number of times upon restart of the vehicle, the controller turns on a warning light to inform a user of the breakdown of the check valve.

18. The fuel system according to claim 17, wherein, when the number of check valve breakdown detections is less than the predetermined number of times, the controller does not turn on the warning light.

\* \* \* \* \*